United States Patent
Hunt et al.

(10) Patent No.: US 9,971,441 B2
(45) Date of Patent: May 15, 2018

(54) TOUCH SENSITIVE SYSTEM WITH HAPTIC FEEDBACK

(71) Applicant: Sony Mobile Communications Inc., Tokyo (JP)

(72) Inventors: Alexander Hunt, Tygelsjö (SE); Samir Drincic, Lund (SE); Ola Thörn, Limhanm (SE)

(73) Assignee: Sony Mobile Communications Inc., Tokyo (JP)

( * ) Notice: Subject to any disclaimer, the term of this patent is extended or adjusted under 35 U.S.C. 154(b) by 0 days. days.

(21) Appl. No.: 14/828,257

(22) Filed: Aug. 17, 2015

(65) Prior Publication Data

US 2017/0052624 A1    Feb. 23, 2017

(51) Int. Cl.
G06F 3/041 (2006.01)
G06F 3/01 (2006.01)
G06F 3/044 (2006.01)
G06F 3/045 (2006.01)

(52) U.S. Cl.
CPC ........... *G06F 3/0416* (2013.01); *G06F 3/016* (2013.01); *G06F 3/044* (2013.01); *G06F 3/045* (2013.01); *G06F 2203/04102* (2013.01); *G06F 2203/04103* (2013.01); *G06F 2203/04112* (2013.01)

(58) Field of Classification Search
None
See application file for complete search history.

(56) References Cited

U.S. PATENT DOCUMENTS

| 8,917,244 B2 * | 12/2014 | Grothe | G06F 3/016 345/156 |
| 2011/0227872 A1 | 9/2011 | Huska et al. | |
| 2012/0306790 A1* | 12/2012 | Kyung | G06F 3/016 345/173 |
| 2014/0055382 A1 | 2/2014 | Kwon et al. | |
| 2016/0062505 A1* | 3/2016 | Hwang | G06F 3/0412 345/174 |

OTHER PUBLICATIONS

International Search Report and Written Opinion Corresponding to International Application No. PCT/162016/050846; dated May 12, 2016; 6 Pages.

(Continued)

*Primary Examiner* — Seokyun Moon
(74) *Attorney, Agent, or Firm* — Myers Bigel, P.A.

(57) ABSTRACT

A touch sensor is presented. The touch sensor comprises a first electrode (21*a*); a second electrode (21*b*); a spacing layer (22) disposed between the first and second electrodes to separate the first and second electrodes; a first sealing layer (23*a*) and a second sealing layer (23*b*), wherein the first and second electrodes and the spacing layer are disposed between the first and second sealing layers; wherein the first electrode, the second electrode, the spacing layer, the first sealing layer and the second sealing layer are bendable; a capacitive touch circuitry (24) arranged to sense a capacitive coupling between the first and second electrodes and to output a capacitive touch signal as a response to a change in the capacitive coupling; and a charge inducing circuitry (25) connected to the first and second electrodes arranged to independently induce electric charge to the first and second electrodes. A touch sensitive system comprising the touch sensor is also presented.

12 Claims, 2 Drawing Sheets

(56) References Cited

OTHER PUBLICATIONS

Walker, "Fundamentals of Projected-Capacitive Touch Technology", downloaded Jan. 12, 2016 from http://www.walkermobile.com/SID_2014_Short_Course_S1.pdf, Jun. 1, 2014, 196 pp.

Weigel et al., "iSkin: Flexible, Stretchable and Visually Customizable On-Body Touch Sensors for Mobile Computing", *CHI 2015*, Seoul, Republic of Korea, Apr. 18-23, 2015, 10 pp.

Woo et al., "A thin all-elastomeric capacitive pressure sensor array based on micro-contact printed elastic conductors", *Journal of Materials Chemistry C*, 2, Mar. 26, 2014, pp. 4415-4422.

* cited by examiner

TOUCH SENSITIVE SYSTEM WITH HAPTIC FEEDBACK

TECHNICAL FIELD

The present invention relates to touch sensitive system for providing haptic feedback.

BACKGROUND

Skin-like touch interfaces attachable directly to the skin of a human is recognized as a promising input surface for interactions with e.g. mobile and wearable devices. A number of prototype skin-like touch interfaces are present today. One example is disclosed by Martin Weigel et al. in CHI '15 Proceedings of the 33rd Annual ACM Conference on Human Factors in Computing Systems, Pages 2991-3000.

Moreover, haptic technology, which provides a haptic sense to a user for reinforcing the user's experience in operational connection with the touch interface, is recently attracting much attention. The haptic technology provides various haptic senses to a user when the user interacts with a touch interface, and thus provides feedback that is obtained by merging a visual sense and a haptic sense. Electronic devices using the haptic technology can provide a more realistic touch interface compared to existing electronic devices.

Thus, there is a need for skin-like touch interfaces configured to provide haptic feedback.

SUMMARY OF THE INVENTION

In view of the above, it is an object of the present invention to provide skin-like touch interfaces configured to provide haptic feedback.

According to a first aspect a touch sensor is provided. The touch sensor comprises a first electrode; a second electrode; a spacing layer disposed between the first and second electrodes to separate the first and second electrodes; a first sealing layer and a second sealing layer, wherein the first and second electrodes and the spacing layer are disposed between the first and second sealing layers; a capacitive touch circuitry arranged to sense a capacitive coupling between the first and second electrodes and to output a capacitive touch signal as a response to a change in the capacitive coupling; and a charge inducing circuitry connected to the first and second electrodes arranged to independently induce electric charge to the first and second electrodes. The first electrode, the second electrode, the spacing layer, the first sealing layer and the second sealing layer are bendable.

By independently applying charge to the first and second electrodes haptic feedback may be provided to the user of the touch sensor. The charge on the two electrodes may either have different polarity attracting the two opposite electrodes or have same polarity, repelling the two opposite electrode.

The capacitive touch circuitry may also act as the charge inducing circuitry. This will provide a more compact touch sensor.

The touch may further comprise an adhesive disposed at an outside of the first sealing layer. This will provide means for attaching the touch sensor to a surface. For example the touch sensor may be attached to the skin of a human.

The first and second sealing layers may comprise silicone, preferably polydimethylsiloxane (PDMS). The spacing layer may comprise silicone, preferably PDMS and/or Ecoflex®.

The first and second electrodes may comprise carbon filled PDMS (cPDMS) and/or silver filled PDMS AgPDMS. Other flexible electrodes may be used as well. Some examples are a metal mesh, Graphene and PEDOT.

The spacing layer may be non-uniform in thickness.

The spacing layer may be perforated with through holes.

The touch sensor may further comprise a resistive touch circuitry arranged to sense a change in resistance between the first and second electrodes and to output a resistive touch signal as a response to the change.

According to a second aspect a touch sensitive system is provided. The touch sensitive system comprises the touch sensor according to any of the embodiments described herein and a controller connected to the capacitive touch circuitry and to the charge inducing circuitry. The controller is arranged to receive the capacitive touch signal from the capacitive touch circuitry and to control the charge inducing circuitry to independently induce electric charge to the first and second electrodes as a response to the capacitive touch signal.

The controller may be arranged to control the charge inducing circuitry to induce one of electric charge having the same polarity and electric charge having opposite polarity to the first and second electrodes as a response to the capacitive touch signal.

The touch sensor and the controller may be arranged to wirelessly communicate with each other.

The controller may be connected to the resistive touch circuitry of the touch sensor. The controller may be arranged to receive the resistive touch signal from the resistive touch circuitry and to control the charge inducing circuitry to independently induce electric charge to the first and second electrodes as a response to the resistive touch signal.

The controller may be arranged to control the charge inducing circuitry to induce one of electric charge having the same polarity and electric charge having opposite polarity to the first and second electrodes as a response to the resistive touch signal.

In response to the resistive touch signal the controller may be arranged to control the charge inducing circuitry to induce electric charge to the first and second electrodes having a different polarity combination than in response to the capacitive touch signal. This will provide the user to get different haptic feedback from a resistive touch as compared to from a capacitive touch.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

The present invention is directed towards enabling haptic feedback to a bendable and/or stretchable touch sensor. This is achieved by applying electric charge to opposite electrodes within the touch sensor. Charge with different polarity will attract the opposite electrode and charge with same polarity will repel the opposite electrode and hence haptic feedback may be provided.

Figure 1:
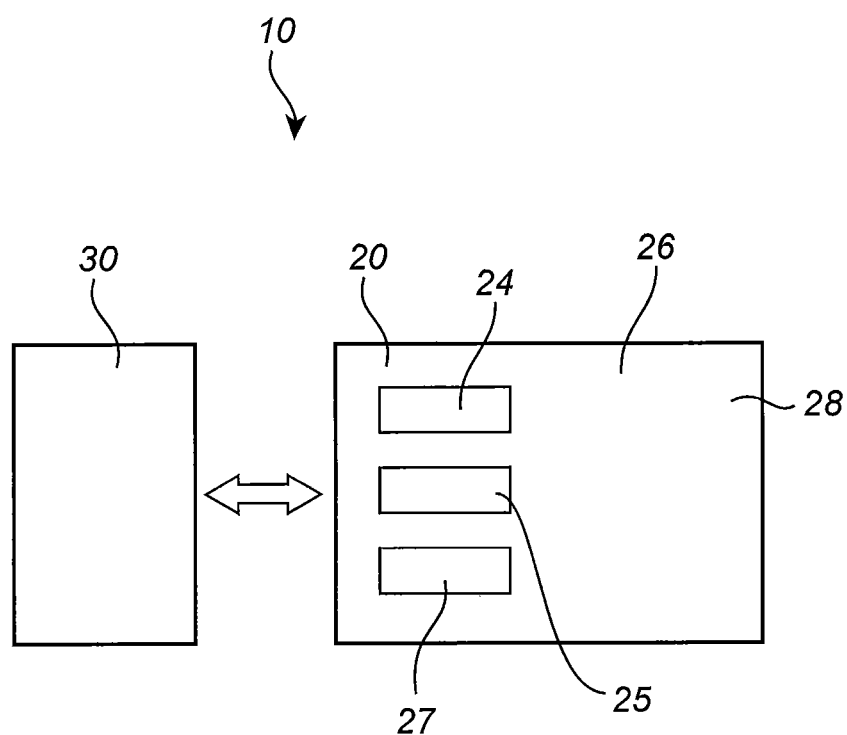
FIG. 1 is a schematic block diagram of a touch sensitive system.

FIG. 1 illustrates a block diagram of a touch sensitive system 10. The touch sensitive system 10 comprises a touch sensor 20 and a controller 30.

The controller 30 may be connected to the touch sensor 20 by electrically conducting wiring. Alternatively, or in combination the controller 30 may be wirelessly connected to the touch sensor 20. The controller 30 is configured to send control signals to the touch sensor 20 via the connection between the controller 30 and the touch sensor 20. The controller 30 is configured to receive signals from the touch sensor 20 via the connection between the controller 30 and the touch sensor 20. The controller 30 may be implemented by hardware, software or a combination thereof. The controller 30 may be arranged in a mobile or wearable device, such as a mobile phone, a smart watch, smart clothing etc. Alternatively or in combination, the controller 30 may be implemented as a dedicated controller unit. The dedicated controller unit may be attached to the touch sensor 20.

The touch sensor 20 comprises a body 26 made of a bendable material. This allows the touch sensor 20 to be worn directly on the skin of a human. Alternatively or in combination, the touch sensor 20 may be attached underneath or on top of clothing. The touch sensor 20 may also be used in other implementations wherein input from a user is needed. Further, the material of the body 26 is preferable flexible and stretchable such that the body 26 is flexible and stretchable enough to be worn over joints (such as a finger joint, a wrist, etc.) of the human body. Preferably the material of the body 26 is silicone. But it is understood that other materials may as well be used. Examples of silicone that may be used are polydimethylsiloxane (PDMS) and Ecoflex®. It is understood that other types of silicone also may be used. The body 26 of the touch sensor 20 may further comprise an adhesive 28 to allow for attachment to the skin of a human or other suitable surface.

Figure 2:
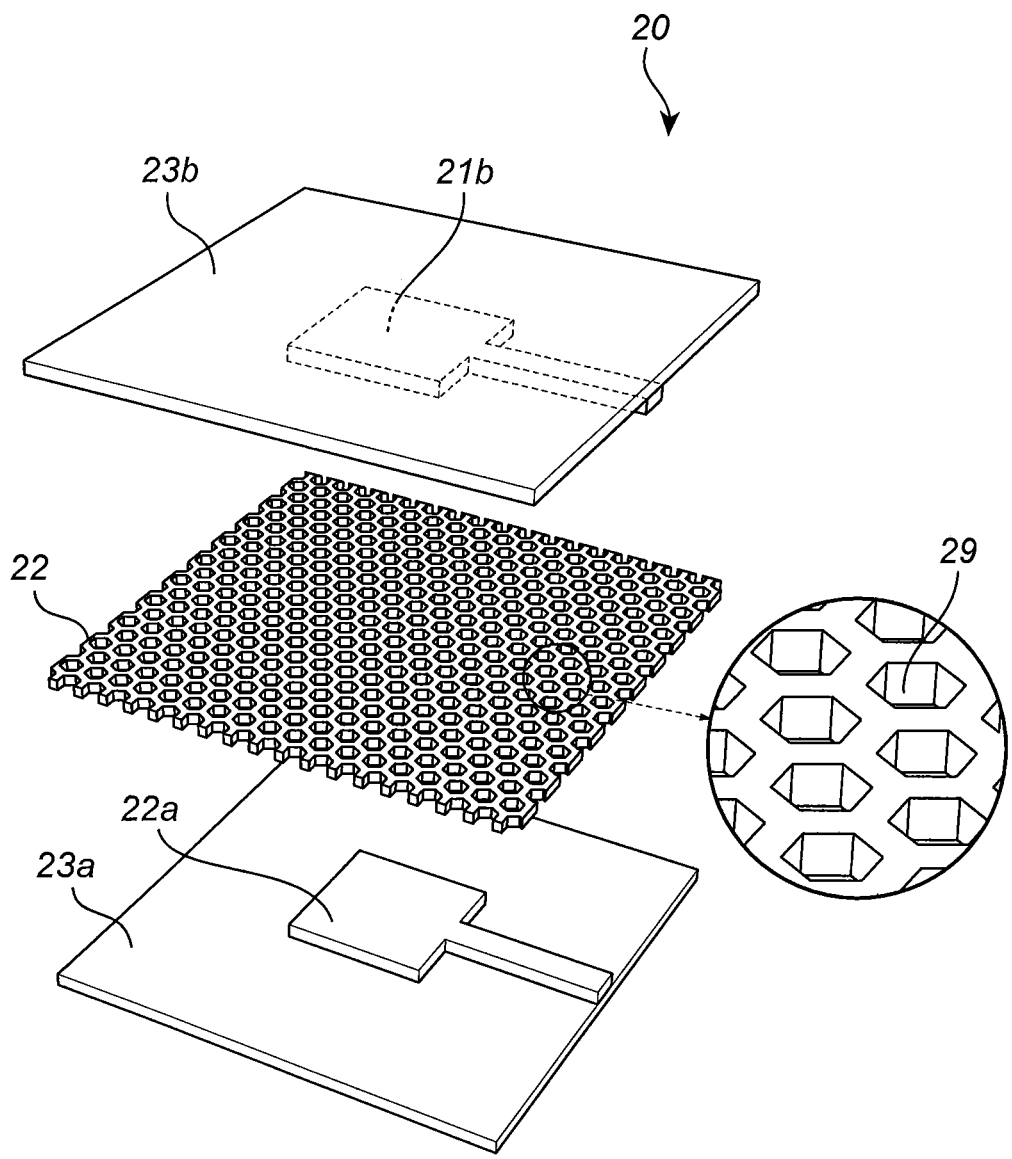
FIG. 2 is an exploded view of a body 26 of a touch sensor 20 of the touch system in FIG. 1.

In FIG. 2 an exploded view of the body 26 of the touch sensor 20 is illustrated. The body 26 of the touch sensor 20 comprises a first electrode 21a, second electrode 21b, a spacing layer 22, a first sealing layer 23a, and a second sealing layer 23b. The spacing layer 22 is disposed between the first and second electrodes 21a, 21b to separate the first and second electrodes 21a, 21b. The first and second electrodes 21a, 21b and the spacing layer 22 are disposed between the first and second sealing layers 23a, 23b. Hence, the first electrode 21a, the second electrode 21b, the spacing layer 22, the first sealing layer 23a, and the second sealing layer 23b are stacked together into the body 26 of the touch sensor 20. The body 26 is thus made of multiple layers of material. The first electrode 21a, the second electrode 21b, the spacing layer 22, the first sealing layer 23a, and the second sealing layer 23b are bendable.

The touch sensor 20 further comprises a capacitive touch circuitry 24 and a charge inducing circuitry 25. The capacitive touch circuitry 24 may be implemented by hardware, software or a combination thereof. The charge inducing circuitry 25 may be implemented by hardware, software or a combination thereof.

The first and second sealing layers 23a, 23b may be made of any non conductive bendable material. Preferably, the material is also flexible and/or soft. According to a non-limiting example, the first and second sealing layers 23a, 23b comprises silicone, preferably polydimethylsiloxane (PDMS) or Ecoflex®. Poron® is another example of material that may be used for making the first and second sealing layers 23a, 23b. Poron® as well as PDMS is opaqe material. However, the first and second sealing layers 23a, 23b may also be made of non-opaque material. According to some embodiments, the material for making at least one of the first and second sealing layers 23a, 23b shall be chosen such that print may be applied on the outer surface thereof. The first and second sealing layers 23a, 23b may be made of the same material. The first and second sealing layers 23a, 23b may be made of the different material. According to one embodiment cloth or leather may be used as the first and second sealing layers 23a, 23b; doing so a touch sensor having haptic feedback may be introduced into clothing. Possible applications could be a jacket to control a device or sweat band to control music.

According to non-limiting examples the first and second electrodes 21a, 21b comprises carbon filled PDMS (cPDMS) or silver filled PDMS (AgPDMS). Other flexible electrodes may be used as well. Some examples are a metal mesh, Graphene and PEDOT. The first and second electrodes 21a, 21b may be made of the same material. The first and second electrodes 21a, 21b may be made of the different material. Using non-opaque first and/or second electrodes 21a, 21b, e.g. cPDMS or Graphene, together with an opaque second sealing layer 23b graphical content of interaction buttons, sliders, etc. of the touch sensor may be implemented.

According to a non-limiting example, the spacing layer 22 comprises silicone, preferably PDMS and/or Ecoflex®. Poron® is another example of material that may be used for making the spacing layer 22.

Wiring, preferably made of the same material as the first and second electrodes 21a, 21b, is used for connecting the first and second electrodes 21a, 21b to the capacitive touch circuitry 24 and the charge inducing circuitry 25. Alternatively, or in combination the wiring may be made of a metal mesh.

Hence, according to one embodiment the base material for the body 26 of the touch sensor 20 is PDMS. PDMS is fully transparent, bendable, elastic, and highly biocompatible. PDMS is not electrically conductive. However, cPDMS and AgPDMS are electrically conductive and may thus form electrodes.

The body 26 may thus be formed as a layered sheet shaped body. The area of the sheet shaped body may be in the range of 1 cm$^2$-5 dm$^2$.

The thickness of the layers forming the first and second electrodes 21*a*, 21*b* is 50-200 µm, preferably 100 µm. The thickness of the layers forming the sealing layers 23*a*, 23*b* is 100 µm-2 mm, preferably 400 µm-2 mm. The thickness of the first and second sealing layers 23*a*, 23*b* should be chosen such that enough dielectric material between a pointing object (e.g. a finger or a stylus) will be present so that zero force touch may be implemented. The thickness of the spacing layer 22 is 100-300 µm. Silicone has a relative permittivity of between 3-4 compared to vacuum. Assuming that the area of the first and second electrodes 21*a*, 21*b* arranged to give the haptic feedback is about 1 cm2. The spacing thickness of 100 um gives C=(8.85×10^(−12) *3*0.0001)/0.0001~26.6 pF. This is measurable and so is a spacing difference of 300 um. A distance of 100-300 µm between the first and second electrodes 21*a*, 21*b* is also small enough to give good force for the haptic feedback.

The spacing layer 22 may be non-uniform in thickness. Alternatively or in combination, the spacing layer 22 may comprise a plurality of though holes 29. The though holes 29 may have any geometry. According to one embodiment the though holes 29 are hexagonal in shape. According to one embodiment the area of the through holes is in the same order of magnitude as the area of the first and second electrodes 21*a*, 21*b*. According to one embodiment the area of the through holes is approximately 1 cm$^2$. This will allow space for the first and second electrodes 21*a*, 21*b* to move giving the haptic feedback. However, smaller areas of the through holes may as well be used. For some embodiments the spacing layer 22 does not comprise any through holes.

Hence, the spacing between the first and second electrodes 21*a*, 21*b* may comprise both material in form of e.g. PDMA or Ecoflex® and one or more gap filled with e.g. air. The non-uniform thickness of the spacing layer 22 and/or the through holes 29 of the spacing layer 22 provide for simplifying flexing of the first and second electrodes 21*a*, 21*b* in response to inducing electrical charge on them. The inducing of electrical charge on the first and second electrodes will be explained in more detail below.

The total thickness of the body 26 of the touch sensor 20 is 500-5000 µm. However, at areas of the body 26 of the touch sensor 20 where no electrodes are present the body 26 may be made even thinner, approximately 200 µm.

The capacitive touch circuitry 24 is connected to the first and second electrodes 21*a*, 21*b*. The capacitive touch circuitry 24 is arranged to sense a capacitive coupling between the first and second electrodes 21*a*, 21*b*. The capacitive touch circuitry 24 is further arranged to output a capacitive touch signal as a response to a change in the capacitive coupling between the first and second electrodes 21*a*, 21*b*. Hence, the capacitive touch sensing uses capacitive coupling between the first and second electrodes 21*a*, 21*b*.

The capacitive touch sensing may according to one embodiment be performed according to the following: The first electrode 21*a* is connected to a square wave signal of 1000 kHz generated by the capacitive touch circuitry 24. A sensing signal is received at the second electrode 21*b*. Bringing a pointing object (e.g. a stylus or a finger) near the surface of the touch sensor 20 changes the local electric field, which reduces the mutual capacitance between the first and second electrodes 21*a*, 21*b*. As a response to that the amplitude of the sensing signal decreases. Upon sensing the decrease in the amplitude of the sensing signal the capacitive touch circuitry 24 outputs the capacitive touch signal.

According to another embodiment the capacitive touch sensing may be a capacitive force sensing touch performed according to the following: When a force, with the pointing object (e.g. the stylus of a finger) is applied to the touch sensor 20 the first and second electrodes 21*a*, 21*b* move closer to each other and the capacitance between them will change.

Other possibilities for sensing capacitive may as well be used.

The charge inducing circuitry 25 is connected to the first and second electrodes 21*a*, 21*b*. The charge inducing circuitry 25 is arranged to independently induce electric charge to the first and second electrodes 21*a*, 21*b*. Electrodes with opposite polarity attract each other and electrodes with the same polarity repel each other. By inducing electric charge to the first and second electrodes 21*a*, 21*b* with the same or with opposite polarity haptic feedback may be provided by the touch sensor 20; this since the body 26 of the touch sensor 20 made out of bendable material. Hence, by applying electric charge with opposite polarity on the first and second electrodes 21*a*, 21*b* they will attract each other and by applying electric charge with the same polarity on the first and second electrodes 21*a*, 21*b* they will repel each other. The design of the spacing layer 22 having a non-uniform thickness and/or through holes allows the first and second electrodes 21*a*, 21*b* to have more flexibility to move relative each other as compared with using a spacing layer 22 with uniform thickness.

The capacitive touch circuitry 24 may act as the charge inducing circuitry 25

The controller 30 is arranged to receive the capacitive touch signal from the capacitive touch circuitry 24 and to control the charge inducing circuitry 25 to independently induce electric charge to the first and second electrodes 21*a*, 21*b* as a response to the capacitive touch signal. Specifically, the controller 30 is arranged to control the charge inducing circuitry 25 to induce one of electric charge having the same polarity and electric charge having opposite polarity to the first and second electrodes 21*a*, 21*b* as a response to the capacitive touch signal.

The touch sensor 20 may further comprise a resistive touch circuitry 27. The resistive touch circuitry 27 may be implemented by hardware, software or a combination thereof. The resistive touch circuitry 27 is arranged to sense a change in resistance between the first and second electrodes 21*a*, 21*b*. The resistive touch circuitry 27 is arranged and to output a resistive touch signal as a response to the change in resistance between the first and second electrodes 21*a*, 21*b*. Resistive touch sensing relies on pressure induced by the pointing object (e.g. the stylus or the finger) to create a change in resistance between the first and second electrodes 21*a*, 21*b*. Applying a pressure above a threshold on the touch sensor will close the circuit between the first and second electrodes 21*a*, 21*b*. Hence, by applying a firm touch on the touch sensor 20 the circuit between the first and second electrodes 21*a*, 21*b* will be closed. This will induce a change in the waveform of the sensing signal at the second electrode 21b. Upon sensing the change in the waveform of the sensing signal the resistive touch circuitry 24 outputs the resistive touch signal.

The touch sensor 20 is configured to receive control signals from the controller 30 via the connection between the controller 30 and the touch sensor 20. The touch sensor 20 is configured to send signals to the controller 30 via the connection between the controller 30 and the touch sensor 20.

The controller 30 may be arranged to receive the resistive touch signal from the resistive touch circuitry 27 and to control the charge inducing circuitry 25 to independently induce electric charge to the first and second electrodes 21a, 21b as a response to the resistive touch signal. Specifically, the controller 30 may be arranged to control the charge inducing circuitry 25 to induce one of electric charge having the same polarity and electric charge having opposite polarity to the first and second electrodes 21a, 21b as a response to the resistive touch signal.

In response to the resistive touch signal the controller 30 may be arranged to control the charge inducing circuitry 25 to induce electric charge to the first and second electrodes 21a, 21b having a different polarity combination than in response to the capacitive touch signal. According to a non-limiting example, in response to the capacitive touch signal the controller 30 is arranged to control the charge inducing circuitry 25 to induce electric charge to the first and second electrodes 21a, 21b having opposite polarity and in response to the resistive touch signal the controller 30 is arranged to control the charge inducing circuitry 25 to induce electric charge to the first and second electrodes 21a, 21b having the same polarity.

The person skilled in the art realizes that the present invention by no means is limited to the preferred embodiments described above. On the contrary, many modifications and variations are possible within the scope of the appended claims.

For example, the touch sensor 20 may comprise a plurality of pairs of first and second electrodes. Each pair of first and second electrodes may be used as a touch input interface. Moreover, each pair of first and second electrodes may be individually controlled for providing haptic feedback to the wearer of the touch sensor 20.

The capacitive touch sensing may be implemented as a zero touch when the user swipes on top of the touch sensor 20. This may be implemented according to the following. When the user swipes on-top of a touchable area of the touch sensor 20 this will be registered by the capacitive touch circuitry 24. The touchable area of the touch sensor 20 is an area of the touch sensor 20 comprising a pair of first and second electrodes. The capacitive touch circuitry 24 sends a capacitive touch signal to the controller 30. The controller 30 process the capacitive touch signal and sends a signal to the charge inducing circuitry 25 to induce charge of the pair of first and second electrodes. According to one embodiment the pair of first and second electrodes is induced with charge having different polarity. This will make the pair of electrodes attract each other. This will be sensed by the user as a haptic feedback indicating that feedback to the user that she is on-top of a pushable button.

The resistive touch sensing may be implemented as a registration of a press action on the touch sensor 20. Hence, when the user presses on a button and activate the resistive touch panel. Alternatively, the capacitive force sensing touch may be used a registration of a press action on the touch sensor 20. If a user decides to press the pushable button resistive touch circuitry 27 or the capacitive touch circuitry 24, depending on how the touch sensor 20 is implemented, will sense that the user has pressed the pushable button. The resistive touch circuitry 27 or the capacitive touch circuitry 24 then sends a touch signal to the controller 30. The controller 30 process the touch signal and sends a signal to the charge inducing circuitry 25 to induce charge of the pair of first and second electrodes. According to one embodiment the pair of first and second electrodes is induced with charge having same polarity. This will make the pair of electrodes repel each other. This will be sensed by the user as a haptic feedback indicating that feedback to the user that the pushable button has been pushed.

Additionally, variations to the disclosed embodiments can be understood and effected by the skilled person in practicing the claimed invention, from a study of the drawings, the disclosure, and the appended claims.

The invention claimed is:
1. A touch sensitive system, comprising:
  a touch sensor, comprising:
    a first electrode;
    a second electrode;
    a spacing layer disposed between the first and second electrodes to separate the first and second electrodes;
    a first sealing layer and a second sealing layer, wherein the first and second electrodes and the spacing layer are disposed between the first and second sealing layers;
    wherein the first electrode, the second electrode, the spacing layer, the first sealing layer and the second sealing layer are bendable;
    a capacitive touch circuitry configured to sense a capacitive coupling between the first and second electrodes and to output a capacitive touch signal as a response to a change in the capacitive coupling;
    a resistive touch circuitry configured to sense a change in resistance between the first and second electrodes and to output a resistive touch signal as a response to the change; and
    a charge inducing circuitry connected to the first and second electrodes and configured to independently induce electric charge to the first and second electrodes;
  the touch sensitive system further comprising a controller connected to the capacitive touch circuitry, to the resistive touch circuitry, and to the charge inducing circuitry, wherein the controller is configured to:
    receive the capacitive touch signal from the capacitive touch circuitry;
    control the charge inducing circuitry to independently induce electric charge to the first and second electrodes as a response to the capacitive touch signal;
    receive the resistive touch signal from the resistive touch circuitry; and
    control the charge inducing circuitry to independently induce electric charge to the first and second electrodes as a response to the resistive touch signal; and
  wherein in response to the resistive touch signal the controller is configured to control the charge inducing circuitry to induce electric charge to the first and second electrodes having a different polarity combination than in response to the capacitive touch signal,
  wherein responsive to the resistive touch signal, the electric charge induced to the first and second electrodes has a first polarity combination,
  wherein responsive to the capacitive touch signal, the electric charge induced to the first and second electrodes has a second polarity combination that is differ- ent from the first polarity combination that was responsive to the resistive touch signal, wherein the polarity of the first and second electrodes are the same or the polarity of the first and second electrodes are opposite.

2. The touch sensitive system according to claim 1, wherein the capacitive touch circuitry comprises the charge inducing circuitry.

3. The touch sensitive system according to claim 1, further comprising an adhesive disposed at an outside of the first sealing layer.

4. The touch sensitive system according to claim 1, wherein the first sealing layer comprises one of polydimethylsiloxane (PDMS), Ecoflex® or Poron® and wherein the second sealing layer comprises one of polydimethylsiloxane (PDMS), Ecoflex® or Poron®.

5. The touch sensitive system according to claim 1, wherein the spacing layer comprises silicone, one of PDMS, Poron® or Ecoflex®.

6. The touch sensitive system according to claim 1, wherein the first and second electrodes comprises one of Graphene, PEDOT, carbon filled PDMS (cPDMS) or silver filled PDMS AgPDMS.

7. The touch sensitive system according to claim 1, wherein the spacing layer is non-uniform in thickness.

8. The touch sensitive system according to claim 1, wherein the spacing layer is perforated with through holes.

9. The touch sensitive system according to claim 1, wherein the touch sensor and the controller is configured to wirelessly communicate with each other.

10. The touch sensitive system according to claim 1, wherein the touch sensor and the controller is configured to wirelessly communicate with each other.

11. The touch sensitive system according to claim 8, wherein an area of the through holes corresponds to an area of the first and second electrodes.

12. The touch sensitive system according to claim 11, wherein the area of the through holes is approximately 1 cm$^2$.

* * * * *